H. C. SAMPLE.
CANDY PULLING MACHINE.
APPLICATION FILED SEPT. 3, 1914.
1,162,711.
Patented Nov. 30, 1915.
2 SHEETS—SHEET 1.
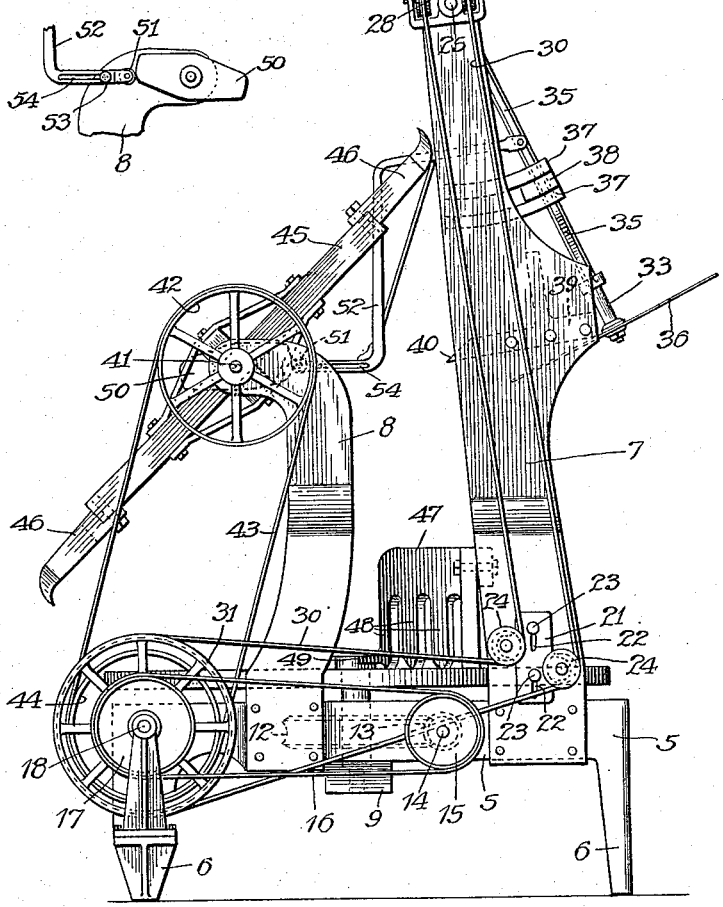
Witnesses
Martin H. Olsen.
A. S. Phillips.
Inventor
Henry C. Sample
By Chas. C. Tillman
Atty.

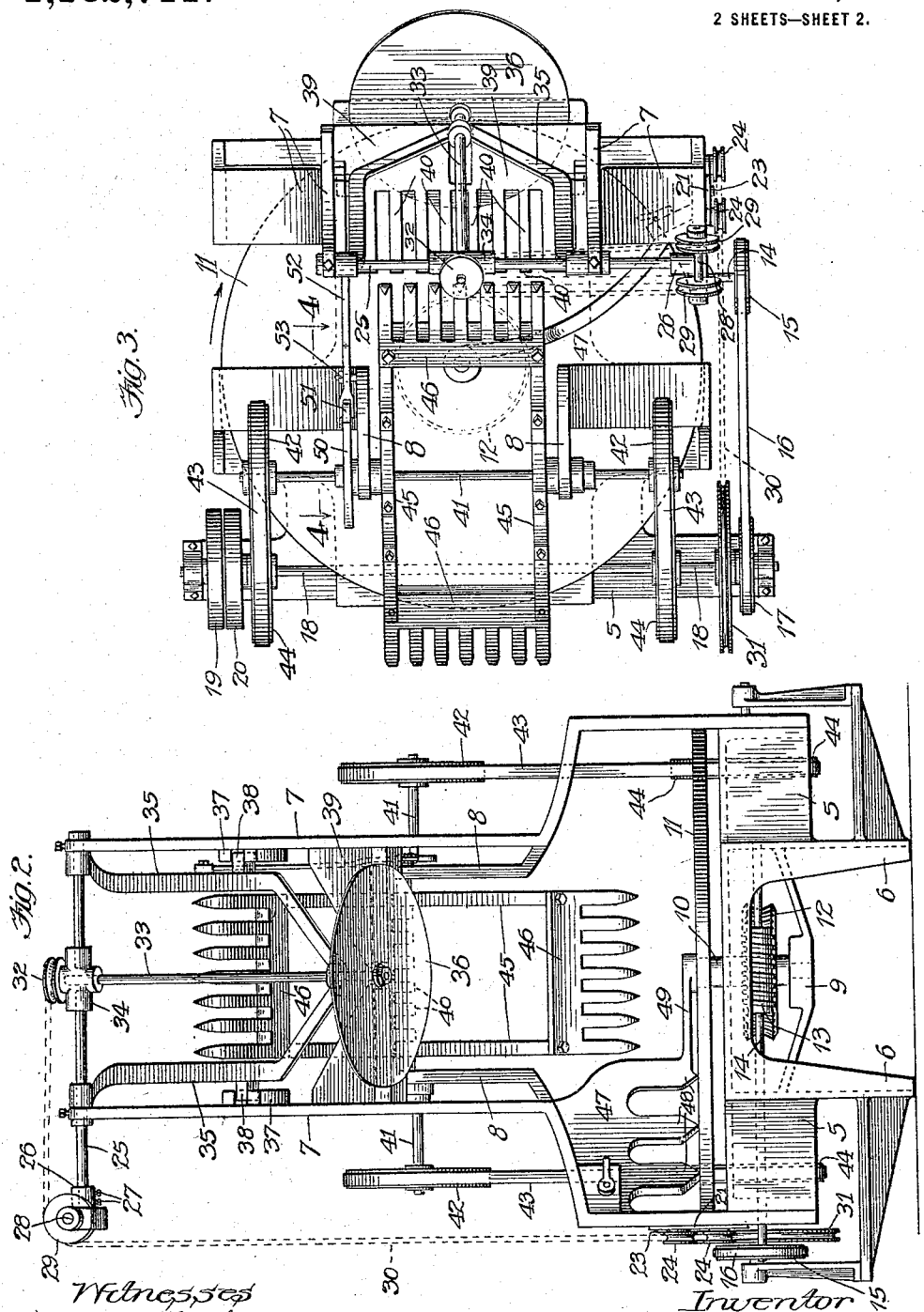

UNITED STATES PATENT OFFICE.

HENRY C. SAMPLE, OF CHICAGO, ILLINOIS, ASSIGNOR OF ONE-HALF TO V. G. GURINIAN, OF CHICAGO, ILLINOIS.

CANDY-PULLING MACHINE.

1,162,711.  Specification of Letters Patent.  Patented Nov. 30, 1915.

Application filed September 3, 1914.  Serial No. 859,950.

*To all whom it may concern:*

Be it known that I, HENRY C. SAMPLE, a citizen of the United States, residing at the city of Chicago, in the county of Cook and State of Illinois, have invented certain new and useful Improvements in Candy-Pulling Machines, of which the following is a specification.

This invention relates to improvements in a machine to be used in the art or process of making candy, and especially that class of candy produced from molasses, and it consists in certain peculiarities of the construction, novel arrangement and operation of the various parts thereof, as will be hereinafter more fully set forth and specifically claimed.

The principal object of the invention is to provide a candy pulling and manipulating machine, which shall be simple and inexpensive in construction, strong, durable and efficient in operation, and so made that the mass or batch of candy will be manipulated thereby, in such a manner as to render more thorough, rapid and satisfactory than heretofore, the operation of aerating it or making it lighter in color or appearance and more porous, or of less density and weight by the chemical agency of the air.

Various other objects and advantages of the invention will be disclosed in the subjoined description and explanation.

In the accompanying drawings, which serve to illustrate the invention—Figure 1 is a view in side elevation, showing the parts in about their initial position; Fig. 2 is a face view of the machine; Fig. 3 is a plan view thereof, and Fig. 4 is a detail view in elevation, taken on line 4—4 of Fig. 3 looking in the direction indicated by the arrows, of a portion of the cam and link which operates in one direction the rotary knife or blade, showing said parts mounted on a portion of one of the uprights of the main frame.

Corresponding reference numerals refer to like parts throughout the different views of the drawings.

In referring to the machine, I will call that portion thereof adjacent to the operator the front of the machine, although the mass or batch of candy manipulated by the machine is not fed rearwardly, but is rotated in a horizontal plane and moved or agitated vertically.

The frame of the machine consists of a stand or base which is designated as a whole by the reference numeral 5, and may be made of any suitable size, form and material, but is preferably supported at a suitable distance from the floor by means of legs 6, located at the front and rear ends of the base. Extended upwardly from the front part of each side of the base is an upright 7, which are slightly inclined at their upper ends rearwardly, as is clearly shown in Fig. 1 of the drawings. Rearwardly of each of the uprights 7 and at each side thereof the base 5 of the main frame is provided with an upright 8, the upper portion of each of which is preferably extended rearwardly, as shown.

Vertically journaled in about the middle of the base 5 and supported at its lower end by means of a bracket 9 is a shaft 10, which has mounted on its upper portion a circular plate or table 11, to rotate with said shaft. Below the top of the base 5 the shaft 10 has mounted thereon a worm gear 12, which meshes with a worm 13 on a shaft 14, which is horizontally and transversely journaled on the front portion of the base 5 and has mounted on one of its ends a pulley 15, which is geared by means of a belt 16 to a pulley 17, mounted on one end of the driving shaft 18, which is horizontally and transversely journaled on the rear portion of the base 5, and is equipped at its other end with a loose and fixed pulley 19 and 20, respectively, to which power may be applied by means of a belt leading from an engine or other source of power supply (not shown).

Mounted on the lower portion of the upright 7, adjacent to the pulley 15 is a bracket 21, which is provided with vertical slots 22, to receive screw bolts 23, extended through said slots and engaging said upright. Journaled on each side of the bracket 21, is a pulley 24, which pulleys may be adjusted by moving the bracket 21 upwardly or downwardly and fixing it in the proper position by means of the screw bolts 23, which are employed for this purpose. Horizontally located on the upper portion of the uprights 7 is a shaft 25, which has one of its ends extended laterally from one of the uprights 7, and said extended portion is equipped with a sleeved hanger 26, fixed to the shaft 25, by means of screw bolts 27. This sleeved hanger has transversely journaled thereon a shaft 28, on each end of which is mounted a grooved pulley 29, over which is passed an endless belt or cable 30, which also passes around a grooved pulley 31, mounted on the driving shaft 18, near the pulley 17 thereon. The endless belt 30 extends at its upper portion around a grooved pulley 32, which is mounted on the upper end of a shaft 33, which is vertically journaled at its upper end in a sleeved hanger 34, which is mounted for oscillation on the shaft 25 about midway between the uprights 7 of the main frame. Loosely mounted at its upper end of the shaft 25, and on each side of the vertical shaft 33, is a brace arm 35, which have their lower portions converged and loosely connected to the lower portion of the shaft 33, so as to brace the same, yet to permit of its free rotation. Mounted on the lower end of the shaft 33, to rotate therewith is a disk, knife or blade 36, which is of sufficient diameter to pass between the uprights 7 of the main frame. Each of said uprights is provided on its inner surface above the rotary blade or knife 36, with a segmental guide or track 37, each of which is adapted to receive a projection 38 on each of the brace arms 35, so that the movement of said arms and said knife will be guided in its movements back and forth. Transversely located between the uprights 7 and directly above the rotary knife or blade 36 is a plate 39, which is slightly rearwardly and downwardly inclined, and is provided with rearwardly extended teeth 40, which form a comb or rake for the purpose to be presently explained. The front middle portion of the plate 9 is provided with a slot for the operation of the rod 33, as shown in Fig. 3, of the drawing.

Horizontally journaled on the upper portion of the uprights 8, of the main frame, is a shaft 41, which is equipped preferably at each of its ends, with a pulley 42, which are geared by means of belts 43, to pulleys 44, mounted on the driving shaft 18, near each of its ends, but it is obvious that one of these pulleys on the shaft 41, as well as one of the pulleys 44, on the shaft 18, may be omitted. Mounted on the shaft 41, so as to rotate therewith, and between the uprights 8, is a frame 45, which has at each of its ends a transversely extended comb or rake 46, the teeth of which are arranged so as to pass between the teeth 40 of the stationary rake or comb 39 in the revolution of the frame 45, which is produced by means of the driving shaft 18, and the gearing connecting said shaft and the shaft 41, which carries the rotary combs or rakes.

Extended from the lower portion of one of the uprights 7 inwardly toward the center of the rotary table or plate 11, is a comb 47, the teeth 48 of which are located just above the upper surface of the plate or table 11, and out of the path of the combs 46. The inner and lower portion of the comb 47 is provided with an arm 49, which loosely engages the upper portion of the shaft 10, on which the table 11 is mounted. Fixed on the shaft 41, outwardly from one of the uprights 8, is a cam 50, which co-acts with or impinges against a roller 51, carried on one end of a link 52, which is loosely connected by means of a pin 53, extended from the upright 8, through a slot 54, in said link. The other end of the link 52 is pivotally connected to one of the brace arms 35, of the rotary shaft 33, so that in the rotation of the cam 50, on the shaft 41, said rotary shaft will be forced outwardly to about the positions shown in the different views of the drawings, when as the cam 50, is turned further, the said rotary shaft 33, by reason of its gravity, as well as the weight of the brace arms 35, and knife 36, will swing inwardly between the uprights 7 of the main frame.

From the foregoing and by reference to the drawings, it will be readily understood and clearly seen that, assuming power is applied to the driving shaft 18, it is apparent that the different shafts of the apparatus will be put in motion, and that by placing a mass of candy between the uprights 7 on the plate 11, it will be carried around thereon and separated by the teeth 48 of the comb 47, after which one of the combs 46 of the rotary frame 45 will engage the mass of candy and stretch or pull it upwardly between the teeth 40 of the comb or rake 39, and that when thus stretched or pulled the cam 50 will release itself from the operating link 52, so as to allow the rotary knife or blade 36 to swing inwardly between the uprights 7 and to sever the strands or portions of the candy extended from the table 11 upwardly, after which operation it is obvious that the candy will fall back on the table 11 and again be carried between the teeth of the comb 47, and separated thereby, and the above named operation repeated. By means of my improvements, it is manifest that the candy will be thoroughly manipulated so as to aerate it and make it lighter in color, more porous, and improve it generally for the market and use.

Having thus fully described my invention, what I claim as new and desire to secure by Letters Patent, is:—

1. A candy pulling machine consisting of a support for a mass of candy, means to pull or stretch the candy upwardly, and means to cut the stretched portion to allow a part of it to fall to said support.

2. A candy pulling machine consisting of means to rotate and comb a mass of candy, means to pull and stretch the candy upwardly, and means to cut the stretched portion to allow it to fall.

3. A candy pulling machine consisting of a support for a mass of candy, means to pull or stretch the candy upwardly, means to comb it while being stretched upwardly, and means to cut the stretched portion at its upper part to allow the lower part of said stretched portion to fall to said support.

4. A candy pulling machine consisting of means to rotate in substantially a horizontal plane a mass of candy, means to comb and stretch the mass during such rotation, means to pull or stretch the candy upwardly, means to comb it while being pulled upwardly, and means to cut the stretched portion at its upper part to allow the lower part of said stretched portion to fall.

5. In a candy pulling machine, the combination with a rotary support, of a comb extended over a part of said support, a comb carrying frame rotatably mounted above said support, and means to rotate the support and said frame.

6. In a candy pulling machine, the combination with a rotary support, of a comb extended over a part of said support, a comb carrying frame rotatably mounted above said support, a fixed comb horizontally and transversely mounted above the rotary support and having its teeth extended into the path of the combs on said rotary comb carrying frame but arranged to allow the teeth of the last named combs to pass between the teeth of the fixed comb, a rotary knife located below the fixed comb and oscillatingly mounted above said comb, and means to rotate the support, the comb carrying frame and to oscillate said knife.

HENRY C. SAMPLE.

Witnesses:
CHAS. C. TILLMAN,
A. S. PHILLIPS.

Copies of this patent may be obtained for five cents each, by addressing the "Commissioner of Patents, Washington, D. C."